Dec. 6, 1932.  G. A. MONTGOMERY  1,889,869
TUBE COUPLING
Filed Aug. 2, 1930

G. A. Montgomery Inventor

By Jesse R. Stone

Attorney

Patented Dec. 6, 1932

1,889,869

UNITED STATES PATENT OFFICE

GUSTAVUS A. MONTGOMERY, OF DALLAS, TEXAS

TUBE COUPLING

Application filed August 2, 1930. Serial No. 472,544.

My invention relates to couplings for tube or pipe. It is particularly adapted for use on drill stems or drive pipe employed in well drilling where a heavy torsional strain is experienced during drilling operations.

An object of the invention is to provide a pipe joint having individual sealing members for each of a pair of pin ends which are screwed into the boxes of a coupling sleeve, said sealing members resting on a common flange which divides them to preclude the possibility of an unscrewing of one of the pin ends being communicated to the other sealing member and its complemental pin end.

A further object of the invention is to provide a sealing member consisting of a yieldable bellows with rings at its opposite ends, said rings being of substantially the same diameter but respectively being loose and relatively tight in the bore of a coupling sleeve by virtue of being spaced from a certain fillet and being fitted in another fillet which is adjacent to a flange by which the respective ring is supported.

A further object of the invention is to define an annular cavity by means of the foregoing fillets, said cavity containing a filling of composition which surrounds the sealing member, the arrangement being such that the filling is capable of being extruded from said cavity past one of the rings of the sealing member toward the pin end of a pipe section screwed into the coupling sleeve.

The device is an improvement upon the structure disclosed in my co-pending application No. 373,356 filed June 24, 1929.

In the drawing herewith Fig. 1 is a central longitudinal section through a coupling embodying my invention.

Figure 1:
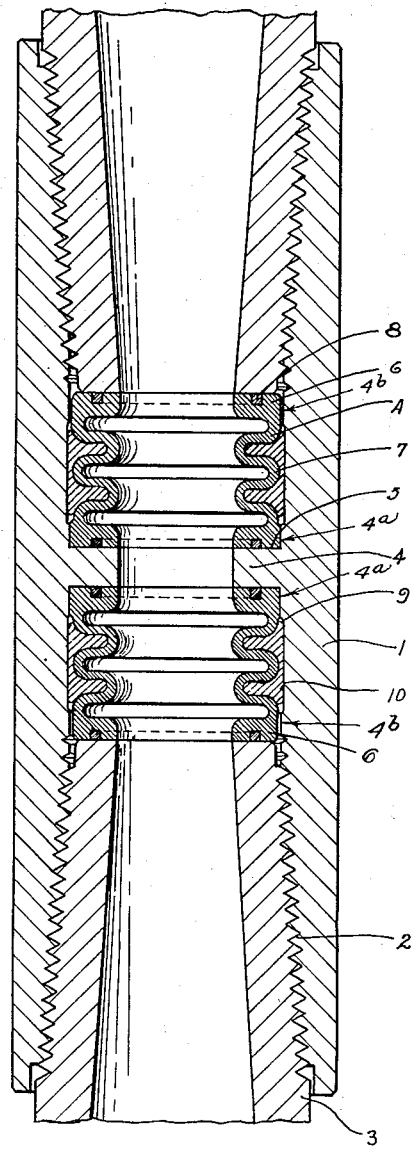
Figure 2:
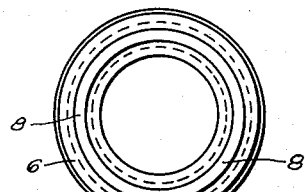
Fig. 2 is an end elevation of my resilient sleeve.
Figure 3:
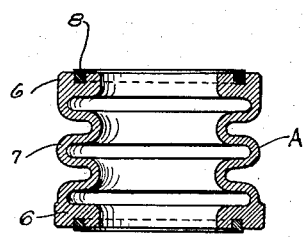
Fig. 3 is a longitudinal section through my sealing member.

In carrying out my invention I employ a coupling sleeve 1, the ends of which are formed with coarsely threaded boxes 2 to receive the ends of pipe sections 3. I form no shoulders on the pipe sections to limit the screwing up of the joints. Midway of the ends of the bore of the coupling 1 is an inwardly projecting flange 4 to act as an abutment, as will be later explained. Each portion of the bore has fillets $4^a$, $4^b$ respectively adjacent to the flange 4 and the threaded boxes 2.

Between the pipe ends and the shoulders 5 on each side of the flange 4 are spring sleeves A which include end rings 6 and connecting bellows-shaped spring members 7. the so-called spring sleeves and spring members being generally denoted a bellows. These rings are of substantially the same diameter. It will be seen that the sleeves are fluid tight between their ends, yet they may be resiliently compressed longitudinally. The rings 6 have grooves formed in their end faces to receive packing elements 8 of soft metal such as copper, to form a seal with the ends of the pipe sections and the shoulders upon the flange 4.

Figure 4:
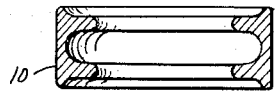
Fig. 4 is a longitudinal section through my filler or packing ring.
Figure 5:
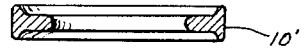
Fig. 5 is a section through another filler ring made in only one stage.
Figure 6:
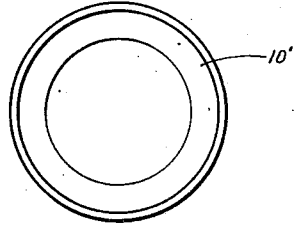
Fig. 6 is an end view of the filler ring.

The wall of the coupling is recessed or counterbored slightly at 9 to form an annular cavity to receive filler rings or inserts 10 of rubber or similar compressible and elastic composition formed with ridges on their inner faces to fit within the convolutions of the spring member 7, said cavity being particularly defined by the aforegoing fillets $4^a$, $4^b$. The bore of the coupling sleeve is of a greater diameter than that of the rings 6, and when one of the rings is inserted in the fillet $4^a$ in a supported position on the flange 4 it makes a relatively tight fit, while the other ring which is abutted by the respective pin end is relatively loose, there being an annular space between it and the fillet $4^b$. The outer periphery of the filler ring is cylindrical to fit within the cavity 9. It is contemplated that these rings 10 will be under compression and thus form a tight sealing fit in the coupling, the substance of said filler rings being subject to extrusion through the annular spaces adjacent to the fillets $4^b$. Said rings may consist of one stage or section as shown in Fig. 5, or may be of several stages or sections as shown in Figs. 1 and 4.

In the use of my invention, the sleeves A will be introduced into the coupling before the tool is employed to connect the ends of the pipe sections. When the pipe end is screwed up tightly, the end thereof will abut with the end of the sleeve A and compress it until the joint is sufficiently tight. A seal will be made with the rings 8 in the end of the sleeves, so that there will be no leakage. The filler rings 10 will also tend to maintain a seal and will frictionally engage the walls of the coupling to maintain the sleeves in position. These springs also reinforce the spring members and resist strains tending to rupture the sleeve.

The rings 6 bear frictionally against the ends of the pipe sections 3 and resist any tendency of the coupling to unscrew in use, the particular purpose of the flange 4 being to separate the sealing members so that an unscrewing tendency of one pin end cannot be transmitted to the other pin end. Where a slight unscrewing does take place, the expansion of the spring will still maintain frictional engagement with the end of the pipe and maintain a seal therewith.

What I claim as new is:

1. A pipe joint for drill stems comprising a sealing member consisting of a bellows and rings at the ends of the bellows, said rings being substantially of the same diameter, a coupling having a threaded socket to receive a pipe section for abutting one of the rings, said socket merging into a cylindrical bore of a diameter greater than that of the rings thereby providing a space around the abutted ring, and a flange in said bore providing a support for the other ring, said bore having a fillet adjacent to the flange in which said other ring has a relatively tight fit.

2. A pipe joint for drill stems comprising a sealing member consisting of a bellows and rings at the ends of the bellows, said rings being substantially of the same diameter, a coupling having a threaded socket to receive a pipe section for abutting one of the rings, said socket merging into a cylindrical bore of a diameter greater than that of the rings thereby providing a space around the abutted ring, a flange in said bore providing a support for the other ring, said bore having a fillet adjacent to the flange in which said other ring has a relatively tight fit, and a composition filling in the bore around said bellows which is subject to extrusion into the space around the first ring toward said pipe section.

3. A tubular pipe joint for drill stems including a coupling having a cylindrical bore and a threaded socket at one end to receive the pipe section, a flange in said bore, fillets in said bore, one being adjacent to the flange and the other adjacent to the threaded socket, said fillets defining an annular cavity, a pair of end rings one of which is tightly fitted in the fillet next to the flange the other loosely occupying the fillet next to the threaded socket to leave an annular space, a bellows connecting the rings, and a filling of composition normally occupying the annular cavity between the fillets.

4. In a tubular coupling having threaded boxes at each end, pins screwed into the boxes, and a radial flange in the bore of said coupling; a sleeve on each side of said flange to receive the end thrust of the respective pin end, said sleeves being circumferentially corrugated to make them longitudinally resilient for limited yielding under said end thrust, rings at the terminals of said sleeves, and inserts of elastic material between said sleeves and the bore of said coupling and fitting within said corrugated portions.

In testimony whereof, I hereunto affix my signature, this the 14th day of July A. D., 1930.

GUSTAVUS A. MONTGOMERY.